Patented Mar. 5, 1940

2,192,259

UNITED STATES PATENT OFFICE 2,192,259

MANUFACTURE OF ALIPHATIC ANHYDRIDES

Henry Dreyfus, London, England

No Drawing. Application July 18, 1934, Serial No. 735,788. In Great Britain August 9, 1933

5 Claims. (Cl. 202—67)

This invention relates to the manufacture of aliphatic anhydrides by the thermal decomposition of the vapours of the corresponding acids. The invention is particularly important in relation to the manufacture of acetic anhydride.

In the manufacture of aliphatic anhydrides, and particularly acetic anhydride, by the thermal decomposition of the vapours of acetic acid or other corresponding aliphatic acid, the first proposals involved the complete condensation of the mixture obtained by the thermal decomposition. In my U. S. Patent No. 1,735,959, I pointed out the disadvantages of this procedure and the loss of anhydride consequent upon the re-union of the water with the anhydride during the condensation. I found that re-union of the water with the anhydride took place largely at temperatures below the boiling point of water, and hence that much better yields were obtained if the anhydride were separated from the water while the water remained in gaseous or vapour form. Various means have been suggested for the separation of the water from the anhydride while the water is in vapour form, such means involving, for example, the use of a simple fractionating column in which the temperature of the top plate is somewhat above the boiling point of water but below the boiling point of the anhydride. The separation may likewise be facilitated by the presence during the separation of an agent which increases the difference between the boiling points or vapour tensions of the anhydride and the water.

I have now found that the yield of anhydride may be improved by subjecting the reaction products to condensation in the presence of additional aliphatic acid and/or anhydride. Preferably the additional acid and/or anhydride may be injected into the vapours proceeding from the thermal decomposition. Such a process has the advantage over the use of solvents which increase the difference between the boiling points and vapour tensions of the anhydride and the water that it does not involve admixture of the thermal decomposition products with substances of another character. The invention is particularly important when the acid or anhydride to be injected or otherwise mixed with the thermal decomposition products of the aliphatic acids is the anhydride which is being produced or is the corresponding acid, since while exercising a beneficial effect upon the yield of the aliphatic acids or anhydrides in accordance with the broad invention, the use of the same anhydride or the corresponding acid merely involves admixture of the products with a body already contained therein, and therefore eliminates any necessity for a separate operation to remove a foreign substance from the acetic or other aliphatic anhydride.

The proportion of aliphatic acid or anhydride to be mixed with the reaction vapours may vary very considerably with the extent to which the decomposition to aliphatic anhydride has occurred in the thermal decomposition and with the nature of the subsequent separation step to be applied. The acid or anhydride may be mixed with the decomposition vapours in the form of either a liquid or a vapour, and its quantity may be varied in accordance with its initial temperature at the time of injection, with the temperature of the decomposition gases at the time of injection and with the desired temperature of the mixture. Where, as is preferred the resulting mixture after injection of the acid or anhydride is above the boiling point of water, the quantity of anhydride or acid injected can be adjusted accordingly. Thus, for example, the quantity of acid or anhydride injected may be equal to or up to three or even up to five or ten times the quantity of aliphatic acid undergoing decomposition.

It is most advantageous in accordance with the present invention to employ as the major constituent of the injected substances the anhydride which is being produced in the thermal decomposition. However, while the injected liquid may consists solely of the anhydride, it is still more advantageous to have present a small proportion, say up to 10 or 20% of the weight of the injected anhydride, of the corresponding acid. Thus, for instance, where a manufacture involves thermal decomposition of acetic acid it is most advantageous to inject into the reaction vapours acetic anhydride containing about 5–10% or 15% of its weight of acetic acid. By this means any ketene which is contained in the reaction gases is readily converted to further acetic anhydride.

The actual separation of the water from the reaction vapours with the added aliphatic acid and/or anhydride may be effected by any suitable method. Thus, if desired, the whole of the mixture may be subjected to condensation, and in these circumstances it is preferable to inject such a quantity of acetic anhydride and/or acetic acid or other corresponding anhydride and/or acid that the reaction vapours are rapidly cooled down to a temperature approximating to ordinary atmospheric temperature or even lower. An alternative is to introduce the reaction vapours under the surface of a cool liquid comprising the additional acid and/or anhydride so that mixture with the acid and/or anhydride and condensation takes place in a single operation. If desired the additional acid and/or anhydride may be mixed with a quantity of benzene, toluene, xylene, tetrachlorethane or other substantially water-immiscible liquid so as to obtain a separation of the water from the condensate in a single operation.

However, as already indicated, I prefer to effect the separation of the water vapour from the reaction vapours mixed with the additional acid and/or anhydride while the water is in the vapour state, and for this purpose the whole may be subjected to a process of fractional condensation as described in my U. S. Patent No. 1,735,959. Thus, the additional vapours may be introduced into a fractionating column maintained at the appropriate temperatures so that the water passes off from the top of the column and the anhydride is condensed and drawn off at the bottom. If desired, the temperatures may be adjusted so that substantially all of the acid goes off with the water or so that substantially all the acid condenses with the anhydride. Preferably, however, some of the acid is allowed to be carried off with the water and some condensed with the anhydride.

If desired, the water may be separated from the anhydride with the assistance of an agent which has the effect of increasing the difference between the boiling points or vapour tensions of the anhydride and water. Thus, such a liquid may lower the boiling point or increase the vapour tension of the water or increase the boiling point or lower the vapour tension of the anhydride. Hydrocarbons and chlorinated hydrocarbons are in general most suitable for this purpose. While such a process involves subsequent separation of the added solvent, nevertheless one advantage of the invention, namely the increased yield of anhydride, still obtains.

The process of the invention is applicable broadly to any thermal decomposition of acetic acid or other aliphatic acid to the corresponding anhydride, whether or not the thermal decomposition is carried out in the presence of catalysts, for example water-binding agents such as bisulphates, pyrosulphates and the like, calcium chloride or zinc chloride, phosphoric acids for example ortho-phosphoric acid or their salts, tungstic acid or its salts. The actual thermal decomposition may be carried out at any appropriate temperature, for example a temperature of 300–900° C. and preferably about 450–700° C. in the case of acetic acid. It is preferable to preheat the acetic acid prior to the actual thermal decomposition so as to raise the temperature of the acid vapour before entering the thermal decomposition chamber. This preheating may be effected in any suitable manner, for example acetic acid may be caused to boil under a suitably increased pressure to obtain the requisite degree of preheating, but preferably the acetic acid obtained from simple boiling of the dilute or concentrated acid is superheated by passage, for example, through suitable preheaters heated with the aid of superheated steam or other suitable heating medium. Alternatively the acid vapours may be superheated by passage through hot molten baths. It is particularly advantageous to preheat to a temperature near to but short of the thermal decomposition temperature, but inasmuch as during the preheating step catalysts are not in general present, the temperature for the preheating may approximate very closely to that of the reaction zone itself, though it is advantageous to employ a preheating temperature somewhat below, say 50–100° C. below, that of the reaction zone.

The process of the invention may be applied to acetic acids of any suitable concentration, but it is particularly important in relation to acetic acids of 90 to 95 to 100% strength. Similarly, the invention may be applied to the production of the corresponding anhydride from other aliphatic acids, for example propionic acid or butyric acid.

What I claim and desire to secure by Letters Patent is:

1. Process for the manufacture of the anhydride of a lower fatty acid, which comprises passing the vapor of the acid through a reaction zone wherein at least part thereof is thermally decomposed to the corresponding anhydride and water, injecting into the vapors after they leave the reaction zone a further quantity of the corresponding anhydride under conditions such that after the injection the injected anhydride is in the vapor phase, and then cooling the mixture to such a degree that substantially all the anhydride contained therein is condensed, while the water, and at least the major part of any lower fatty acid which may be contained in the mixture, remain in the vapor phase.

2. Process for the manufacture of acetic anhydride, which comprises passing acetic acid vapor through a reaction zone wherein at least part thereof is thermally decomposed to acetic anhydride and water, injecting into the vapors after they leave the reaction zone a further quantity of acetic anhydride under conditions such that after the injection the injected acetic anhydride is in the vapor phase, and then cooling the mixture to such a degree that substantially all the acetic anhydride contained therein is condensed, while the water, and at least the major part of any acetic acid which may be contained in the mixture, remain in the vapor phase.

3. Process for the manufacture of acetic anhydride, which comprises passing acetic acid vapor through a reaction zone wherein at least part thereof is thermally decomposed to acetic anhydride and water, continuously injecting into the vapors after they leave the reaction zone a further quantity of acetic anhydride under conditions such that after the injection the injected acetic anhydride is in the vapor phase, and then cooling the mixture to such a degree that substantially all the acetic anhydride contained therein is condensed, while the water, and at least the major part of any acetic acid which may be contained in the mixture, remain in the vapor phase.

4. Process for the manufacture of the anhydride of a lower fatty acid, which comprises passing the vapor of the acid through a reaction zone wherein at least part thereof is thermally decomposed to the corresponding anhydride and water, continuously injecting into the vapors after they leave the reaction zone a further quantity of the corresponding anhydride together with up to 20% of its weight of the lower fatty acid under conditions such that after the injection the injected anhydride and acid are in the vapor phase, and then cooling the mixture to such a degree that substantially all the anhydride contained therein is condensed, while the water, and at least the major part of the lower fatty acid content of the mixture, remain in the vapor phase.

5. Process for the manufacture of acetic anhydride, which comprises passing acetic acid vapor through a reaction zone wherein at least part thereof is thermally decomposed to acetic anhydride and water, continuously injecting into the vapors after they leave the reaction zone a further quantity of acetic anhydride together with 5–15% of its weight of acetic acid under conditions such that after the injection the injected acetic anhydride and acetic acid are in the vapor phase, and then cooling the mixture to such a degree that substantially all the anhydride contained therein is condensed, while the water, and at least the major part of the acetic acid content of the mixture, remain in the vapor phase.

HENRY DREYFUS.